Figure 4:
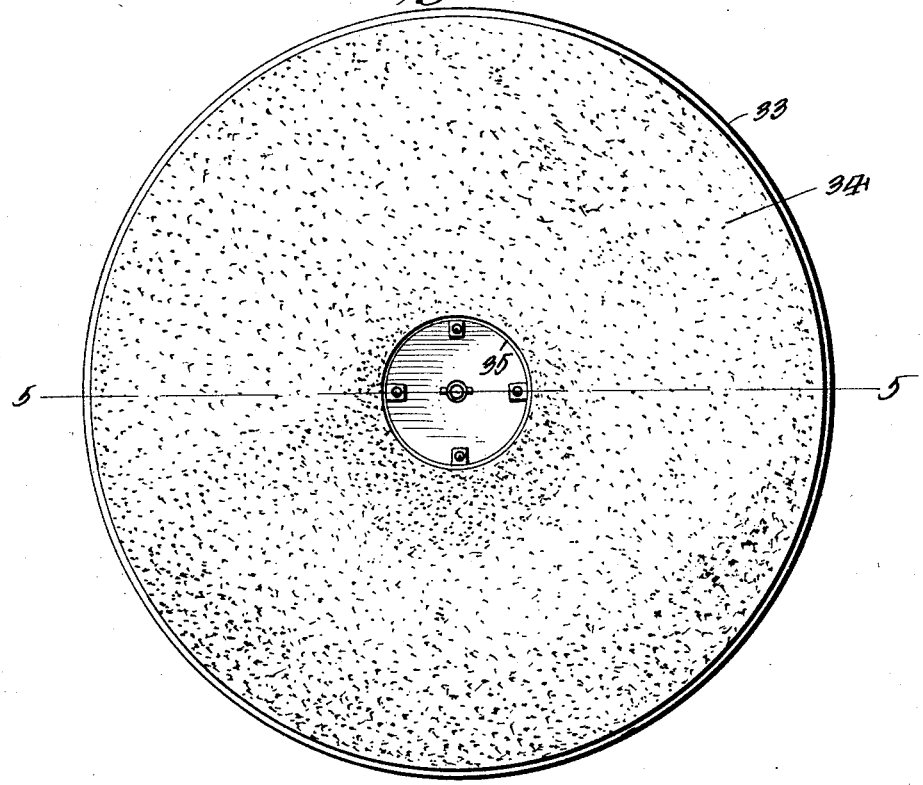

Nov. 6, 1928.
L. N. HALEY
1,690,195
CITRUS FRUIT BRUSHING AND POLISHING APPARATUS
Filed Nov. 1, 1924   3 Sheets-Sheet 1
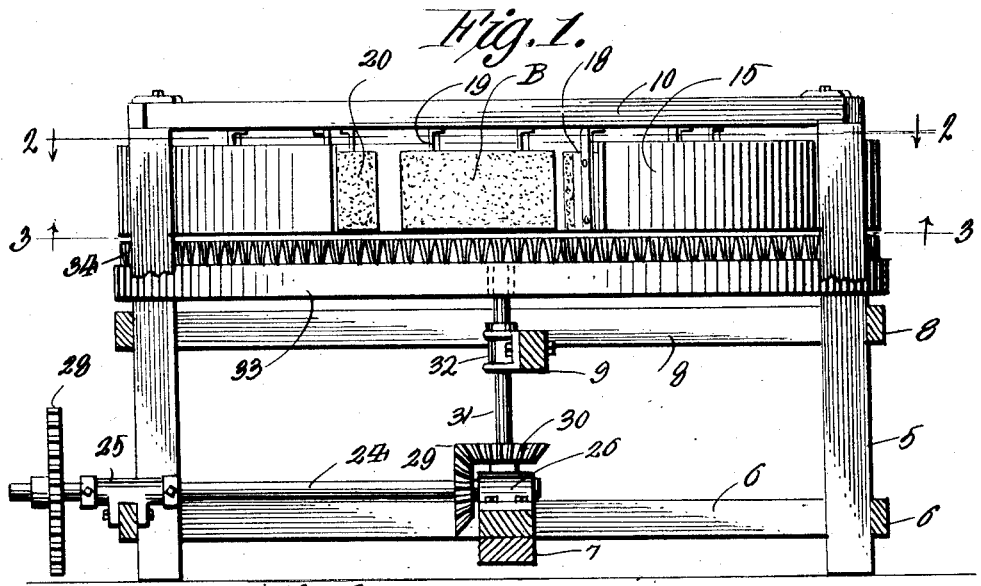
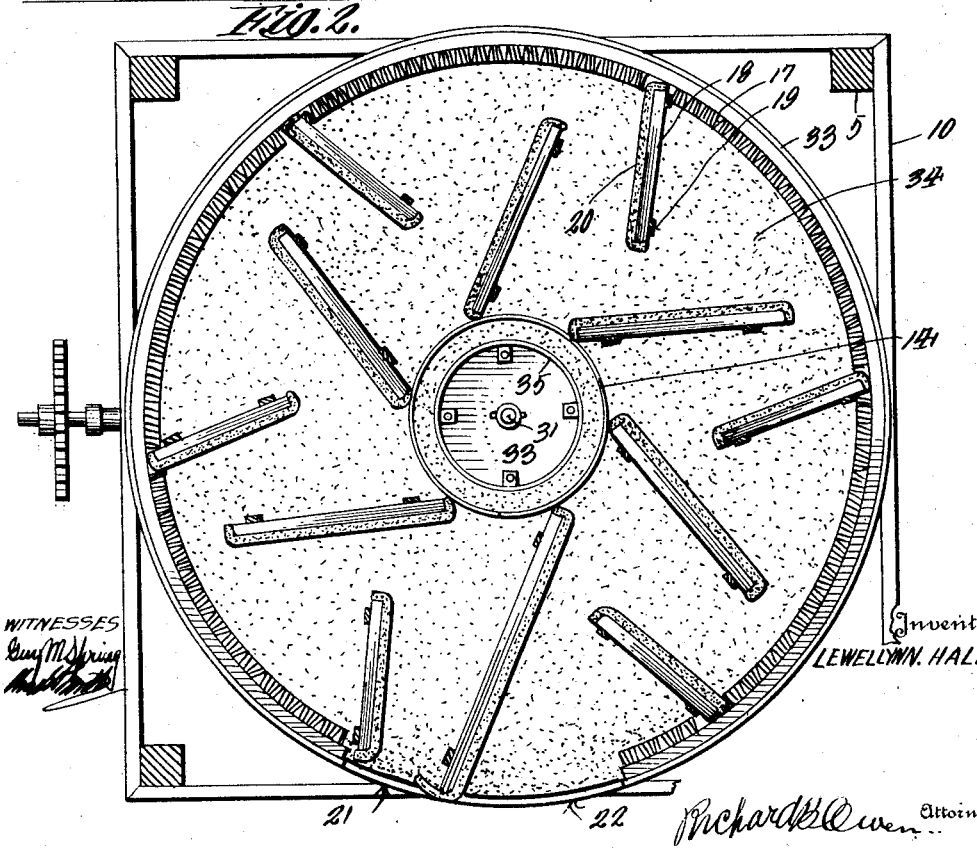

Nov. 6, 1928.
L. N. HALEY
1,690,195
CITRUS FRUIT BRUSHING AND POLISHING APPARATUS
Filed Nov. 1, 1924  3 Sheets-Sheet 2
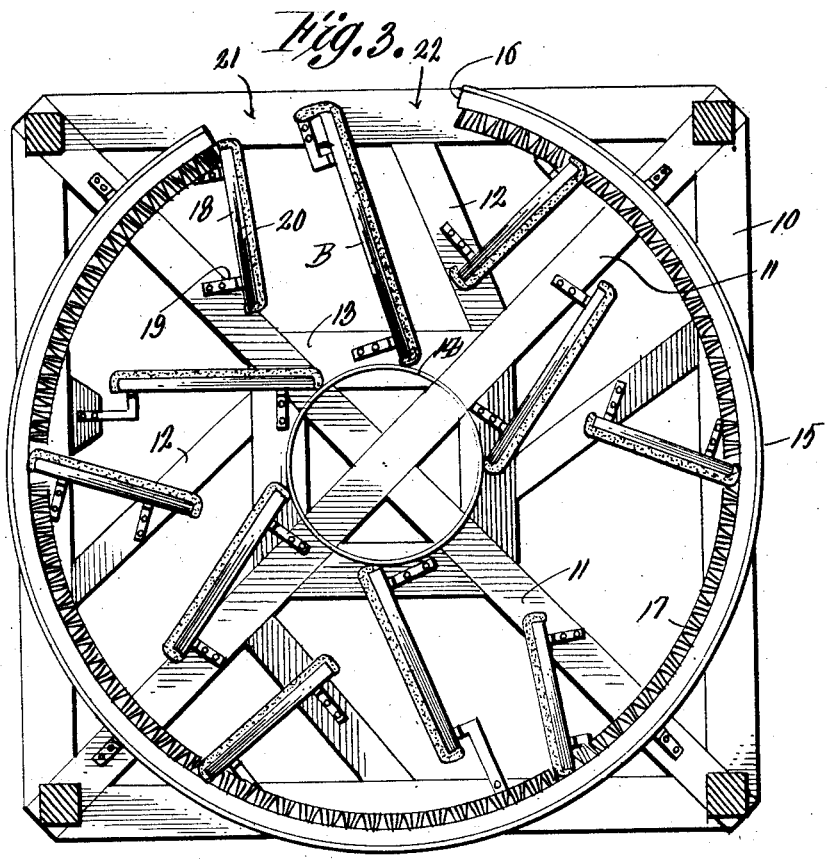
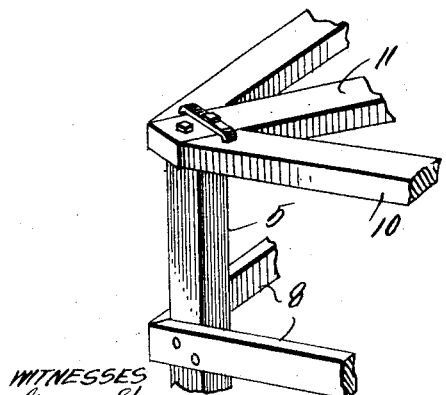
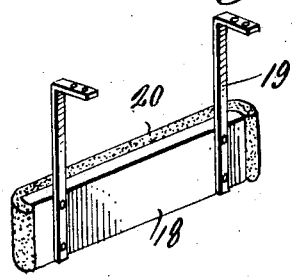
Inventor
LEWELLYN N. HALEY Patented Nov. 6, 1928.

1,690,195

UNITED STATES PATENT OFFICE.

LEWELLYN N. HALEY, OF CLEARWATER, FLORIDA.

CITRUS-FRUIT BRUSHING AND POLISHING APPARATUS.

Application filed November 1, 1924. Serial No. 747,220.

The present invention appertains to a citrus fruit brushing and polishing apparatus and has for its prime object to provide a device of this nature to which the fruit may be fed after which it will be thoroughly brushed and polished, when the apparatus is in operation, without further attention on the part of the attendant, said fruit being automatically delivered from the apparatus.

Another important object of the invention is to provide a structure which is capable of being easily assembled, the parts being so arranged that they may be readily cleaned, being at all times accessible.

A still further very important object of the invention is to generally improve upon machines of this nature by providing a very simple and efficient construction, one which is reliable in operation, comparatively inexpensive to construct, strong, durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 5:
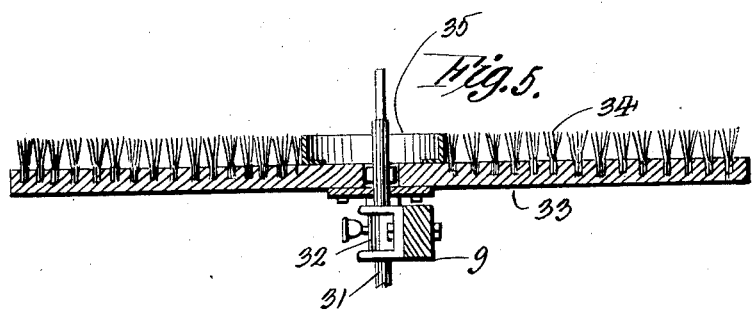

In the drawing:

Figure 1 is a side elevation of the machine embodying the features of my invention, portions of the frame being shown in section, Figure 2 is a horizontal section through the machine taken substantially on the line 2—2 of Figure 1 looking downwardly in the direction of the arrows, a portion of the frame being broken away, Figure 3 is a horizontal section through the machine taken on the line 3—3 of Figure 1 looking upwardly in the direction of the arrow, Figure 4 is a plan view of the turn table, Figure 5 is a section therethrough substantially on the line 5—5 of Figure 4, Figure 6 is a detail perspective view showing a corner of the frame, and Figure 7 is a perspective view of one of the polishing elements.

Referring to the drawing in detail wherein the preferred embodiment of the invention is disclosed by way of example, it will be noted that like reference numerals refer to like parts throughout the several views. The framework of this machine is supported on four uprights 5 which are braced by bars 6 adjacent their bottom ends. Two of these bars 6 support a beam 7. Bars 8 brace the uprights 5 intermediate their ends and two of them support a beam 9 which is located above beam 7. Four bars 10 connect the tops of the uprights and extend along the sides of the apparatus and two diagonally disposed bars 11 are also supported at the tops of these uprights. The bars 10 and 11 support bars 12 and 13. A circular wall 14 depends from bars 11 so as to surround the juncture thereof and be centrally located. A split ring 15 is hung from the lattice work formed by bars 10, 11, 12 and 13 and is provided with an opening indicated at 16. The diameter of this ring 15 is substantially greater than that of the circular wall 14. The interior of the ring 15 is provided with inwardly extending bristles 17 thereby forming a brush. A plurality of baffle plates 18 are hung from the lattice work by means of brackets 19 and are provided with a polish cover 20 of suitable material. These baffle plates are disposed within the confine of the split ring 15. One of these baffle plates which I have indicated specifically by the letter B is disposed so that its end extends through the opening 16 thereby forming an inlet 21 and an outlet 22.

A shaft 24 is mounted to turn in journal 25 fixed to one bar 6 and journal 26 mounted on bar 7. The outer end of this shaft may be rotated by any suitable power plant a sprocket or gear 28 being provided for this purpose. At the inner end of this shaft a bevel gear 29 is mounted and meshes with a bevel gear 30 on shaft 31. This shaft 31 extends vertically having its bottom end supported on journal 26 and its intermediate portion in journal 32 mounted on bar 9. The upper end of this shaft 31 supports a turn table 33 the upper surface of which is provided with a plurality of bristles 34. These bristles cover the major portion of the turn table, the center only being left vacant and having a circular wall 35 surrounding it which is adapted to be disposed within circular wall 14.

It is thought that the details of construction have been described sufficiently to clearly understand the operation of the apparatus. When the apparatus is set in motion through the shafts 24 and 31 the turn table or rotary brush should be rotating in a clockwise direction when looking down thereon. The fruit is fed into the inlet 21 on the bristles 34 of the rotating turn table 33. It will thus be seen that the fruit will travel about the apparatus coming into contact with the polishing cloths on the baffles 18 and also coming into contact with the bristles 17 on the split ring 15 and will finally be delivered through the outlet 22. It is evident that the baffle plates may be arranged in various different manners. After the fruit has been placed in the inlet on the turn table no further attention to it is required. A larger quantity of fruit may be brushed and polished with this apparatus in a comparatively short space of time and the fruit will not be bruised in any way.

While the preferred embodiment of my invention has been described in detail, it will be understood that I do not wish to be limited to the particular construction set forth, since various changes in the form, material, proportions, and arrangement of parts, and in the details of construction may be resorted to without departing from the spirit and scope of the invention as hereinafter claimed or sacrificing any of its advantages.

Having thus described my invention, what I claim as new is:

1. An apparatus of the class described, including a horizontal rotary table having an upper brushing surface, means to rotate said table, a stationary ring mounted above the rotary table adjacent the periphery of the latter and having an inner brushing surface of cylindrical form, a circular wall disposed concentrically within and spaced from said ring, a series of baffles extending from points spaced inwardly from the ring obliquely inward towards the circular wall, said baffles extending inward in a direction inclined from the radius passing through the outer end in the direction of rotation of said table and having polishing surfaces on the faces toward the radius, a second series of baffles extending from the wall obliquely outward to points spaced from the ring above said table, said last named baffles extending outward in a direction inclined from the radius passing through the inner end in the direction of rotation of said table and having polishing surfaces on the faces toward the radius, said second named baffles alternating with the first named baffles.

2. An apparatus of the class described including a horizontal rotary table having an upper brushing surface, means to rotate said table, a stationary ring mounted above the rotary table adjacent the periphery of the latter and having an inner brushing surface of cylindrical form, a circular wall disposed concentrically within and spaced from said ring, a series of baffles extending from points spaced inwardly from the ring obliquely inward toward the circular wall, said baffles extending inward in a direction inclined from the radius passing through the outer end in the direction of rotation of said table and having polishing surfaces on the faces toward the radius, a second series of baffles extending from the wall obliquely outward to points spaced from the ring above said table, said last named baffles extending outward in a direction inclined from the radius passing through the inner end in a direction of rotation of said tables and having polishing surfaces on the faces toward the radius, said second named baffles alternating with the first named baffles, said ring being split with its ends spaced apart, and one of said first named baffles extending outwardly to the edge of the table intermediate the spaced ends of the split ring to guide fruit fed onto the table at one side of said last named baffle and to cause outward discharge of the cleaned fruit from the table at the other side of said baffle.

3. An apparatus of the class described including a horizontal rotary table having an upper brushing surface, means to rotate said table, a stationary annular ring mounted above the rotary table concentric with and adjacent the periphery of the latter and having an inner cylindrical brushing surface, a circular wall disposed concentrically within and spaced from said ring, and stationary polishing baffles mounted above the table within the confines of said ring and tangentially of said wall.

4. An apparatus of the class described including a horizontal rotary table, means to facilitate rotation thereof, a stationary ring mounted above the rotary table adjacent the edge of the latter and having a cylindrical inner surface, a circular wall disposed concentrically within and spaced from said ring, a circular series of baffles extending from points spaced inwardly from the ring obliquely inward to the circular wall above said table, said baffles extending inward in a direction opposite the direction of rotation of said table, a second circular series of baffles extending from the split ring obliquely inward to points spaced from the circular wall above said table, said last named baffles extending inward in the direction of rotation of said table, said second named baffles alternating with the first named baffles.

In testimony whereof I affix my signature.

LEWELLYN N. HALEY.